US011112343B2

(12) United States Patent
Lee et al.

(10) Patent No.: US 11,112,343 B2
(45) Date of Patent: Sep. 7, 2021

(54) DUST MEASUREMENT APPARATUS

(71) Applicant: LG ELECTRONICS INC., Seoul (KR)

(72) Inventors: Kangsun Lee, Seoul (KR); Taehyung Kim, Seoul (KR); Seunghyun Lee, Seoul (KR); Misook Kim, Seoul (KR); Seonghyok Kim, Seoul (KR); Oedong Kim, Seoul (KR); Hyekyoung Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/464,235

(22) PCT Filed: Nov. 16, 2017

(86) PCT No.: PCT/KR2017/013004
§ 371 (c)(1),
(2) Date: May 24, 2019

(87) PCT Pub. No.: WO2018/101653
PCT Pub. Date: Jun. 7, 2018

(65) Prior Publication Data
US 2019/0391061 A1 Dec. 26, 2019

(30) Foreign Application Priority Data
Dec. 1, 2016 (KR) .................. 10-2016-0162516

(51) Int. Cl.
*G01N 15/06* (2006.01)
*G01N 1/22* (2006.01)

(52) U.S. Cl.
CPC ........... *G01N 15/06* (2013.01); *G01N 1/2205* (2013.01); *G01N 2015/0693* (2013.01)

(58) Field of Classification Search
CPC .............. G01N 15/0205; G01N 15/06; G01N 15/1459; G01N 1/24; G01N 2015/0046;
(Continued)

(56) References Cited

U.S. PATENT DOCUMENTS 5,419,178 A 5/1995 Decker et al.
7,049,824 B2 * 5/2006 Shabino .................. G01N 1/06
324/464

(Continued)

FOREIGN PATENT DOCUMENTS

CA 2538881 5/2005
CN 203672855 6/2014
(Continued)

OTHER PUBLICATIONS

PCT International Application No. PCT/KR2017/013004, Written Opinion of the International Searching Authority dated Feb. 20, 2018, 26 pages.

(Continued)

*Primary Examiner* — Nimeshkumar D Patel
*Assistant Examiner* — Gedeon M Kidanu
(74) *Attorney, Agent, or Firm* — Lee, Hong, Degerman, Kang & Waimey

(57) ABSTRACT

Provided is a dust measurement apparatus for accurately measuring the dust concentration of two spaces and minimizing the possibility of noise generation, comprising: a dust sensor; a body housing having the dust sensor loaded therein, and having an inner space; a first outer hole and a second outer hole, which are respectively formed at two points of the body housing so as to connect the outside and the inner space; a first fan and a second fan, which are provided at the positions corresponding to each of the first outer hole and the second outer hole and driven so as to form (Continued)

a flow toward the inner space from the outside; and a control part for selectively driving the first fan or the second fan.

5 Claims, 12 Drawing Sheets

(58) Field of Classification Search
CPC ............... G01N 2015/025; G01N 9/24; G01N 15/1434; G01N 1/2208; G01N 1/2273; G01N 2001/245; G01N 2015/0288; G01N 2015/0693; G01N 21/53
USPC ........... 73/28.01, 23.2, 28.05, 863.22, 865.5; 378/54, 57
See application file for complete search history.

(56) References Cited

U.S. PATENT DOCUMENTS

| | | | | |
|---|---|---|---|---|
| 10,094,776 B2* | 10/2018 | Yang | .................... | G01N 15/0205 |
| 2006/0042284 A1* | 3/2006 | Heberle | ................. | B60H 1/323 |
| | | | | 62/236 |
| 2009/0039249 A1* | 2/2009 | Wang | ................. | G01N 15/1459 |
| | | | | 250/287 |
| 2010/0172471 A1* | 7/2010 | Sivathanu | ................. | G01N 9/24 |
| | | | | 378/54 |
| 2010/0288921 A1* | 11/2010 | Wang | ................. | G01N 15/1459 |
| | | | | 250/287 |
| 2013/0195245 A1* | 8/2013 | Sivathanu | ............ | G01N 23/044 |
| | | | | 378/54 |
| 2015/0253165 A1* | 9/2015 | Ajay | ........................ | G01N 1/24 |
| | | | | 73/28.01 |
| 2016/0116389 A1* | 4/2016 | Cooper | ................ | G08B 17/125 |
| | | | | 356/340 |
| 2016/0153884 A1 | 6/2016 | Han et al. | | |
| 2016/0223437 A1* | 8/2016 | Ajay | ..................... | G08B 17/113 |
| 2016/0270256 A1* | 9/2016 | Abe | ....................... | G03B 21/16 |
| 2017/0356670 A1* | 12/2017 | Zhang | .................. | F24F 12/006 |

FOREIGN PATENT DOCUMENTS

| | | | |
|---|---|---|---|
| CN | 103954540 | | 7/2014 |
| CN | 104407112 | | 3/2015 |
| CN | 105716914 | | 6/2016 |
| CN | 105717014 | | 6/2016 |
| CN | 105717014 A | * | 6/2016 |
| CN | 106123160 | | 11/2016 |
| JP | H05142109 | | 6/1993 |
| JP | 2010173519 | | 8/2010 |
| JP | 2015141045 | | 8/2015 |
| JP | 2015141045 A | * | 8/2015 |
| KR | 1019990063751 | | 7/1999 |
| WO | 2015132398 | | 9/2015 |
| WO | 2018236571 | | 12/2018 |

OTHER PUBLICATIONS

European Patent Office Application Serial No. 17876169.8, Search Report dated Jun. 24, 2020, 15 pages.
European Patent Office Application Serial No. 17876169.8, Search Report dated Oct. 21, 2020 , 17 pages.
The State Intellectual Property Office of the People's Republic of China Application Serial No. 201780074506.9, Office Action dated Mar. 31, 2021, 8 pages.

* cited by examiner

DUST MEASUREMENT APPARATUS

CROSS-REFERENCE TO RELATED APPLICATIONS

This application is the National Stage filing under 35 U.S.C. 371 of International Application No. PCT/KR2017/013004, filed on Nov. 16, 2017, which claims the benefit of earlier filing date and right of priority to Korean Application No. 10-2016-0162516, filed on Dec. 1, 2016, the contents of which are all hereby incorporated by reference herein in their entirety.

TECHNICAL FIELD

The present invention relates to an apparatus for measuring dust, suitable for performing dust measurement on two or more spaces.

BACKGROUND ART

A dust sensor is used to measure an amount of dust in specific air. For accurate measurement of a dust amount, a measurement target air should pass through a dust sensor.

Therefore, a dust measuring device having a dust sensor includes a structure of making external air flow into or out of the dust sensor.

In the air inflow/outflow structure of the dust measuring device, two major configurations include a configuration of making external air flow in and a configuration of forming a flow path for making the inflow air reach or leave the dust sensor.

In doing so, in order to measure a dust state of external air clearly, a device for making the external air flow in at a predetermined flow amount and a predetermined flow velocity is required. And, it is also necessary to minimize an inflow of air in an unintended area or the like.

The configuration of making external air flow in representatively includes a fan or compressor. The fan or compressor makes air flow in or out by generating a pressure difference between an inside and outside of a dust measuring device.

A single dust sensor basically measures an air state of a single space but may measure air states of areas including two or more spaces by making a time difference in between.

The present invention is based on a premise that air states of areas including two or more spaces are measured.

For examples of a case that a dust concentration measurement is necessary for air of two spaces, there are a case of intending to obtain a dust concentration difference between internal air and external air of a car, a case of intending to obtain a dust concentration difference between the air flowing into an air cleaner and the air flowing out of the air cleaner with respect to the air cleaner, etc.

Thus, in order to measure air states, i.e., dust concentrations of two spaces physically spaced apart from each other, a dust measuring device connected to each outer space can be provided.

Yet, in some cases, air states of two spaces can be measured using a single dust measuring device. The present invention described a dust measuring device usable for such a case.

Thus, in case of measuring dust concentrations of two or more spaces through a single dust measuring device, there are several items that should be considered.

First of all, responsiveness of a dust measurement of each space should be good. Good measurement responsiveness means that the demand for a measurement of each space is obtainable instantly. Namely, in case of intending to measure an air state of a second space in the course of measuring an air state of a first space, the dust measurement responsiveness means an extent of obtaining such intension instantly. The better the responsiveness gets, the smaller the noise of a measurement value becomes.

Secondly, it is necessary to consider the reliability on the sealing of a flow path through which air flows. If air of a different space flows into a path through which air is made to flow into a dust sensor by a fan or pump, as noise is generated, it is unable to obtain an accurate measurement value. Therefore, it is necessary to completely seal the space of the corresponding path.

Or, a flow amount or velocity of air can be affected by an extent of the well-closed or sealing state of a dust measuring device, whereby a difference or noise can be caused to a dust concentration measurement value.

Thirdly, it is necessary to consider the structural simplification. If a dust measuring device is complicated and has an increased volume, various spots need to be sealed so as to cause a problem of the cost increase. Thus, a structure needs to be simplified appropriately.

DISCLOSURE OF THE INVENTION

Technical Task

To solve the aforementioned problem, the technical task of the present invention is to solve a problem of the cost increase caused to measure dust concentrations of two spaces accurately.

Technical Solutions

In one technical aspect of the present invention, provided herein is an apparatus for measuring dust, the apparatus including a dust sensor, a body housing having the dust sensor installed therein and providing an inner space, first and second outer holes respectively formed at two points of the body housing to connect the inner space to an outer environment, first and second fans respectively provided to locations corresponding to the first and second outer holes and driven to form a flow amount in a direction of the inner space from the outer environment, and a controller selectively driving one of the first and second fans.

According to another aspect of the present invention, the first fan is provided to an outside of the first outer hole and the second fan is provided to an outside of the second outer hole.

According to another aspect of the present invention, the first outer hole is connected to an outer first space, the second outer hole is connected to an outer second space, and the outer first space and the outer second space are separated from each other.

According to another aspect of the present invention, the dust sensor includes first and second inner holes formed on both sides of a sensing path going through the dust sensor and a sensing unit provided to a prescribed point on the sensing path, and the apparatus further includes a first vent bracket forming a closed path between the first inner hole and the first outer hole and a second vent bracket forming a closed path between the second inner hole and the second outer hole.

According to another aspect of the present invention, the apparatus further includes a mesh filter provided to each of the first and second vent brackets.

According to another aspect of the present invention, the apparatus further includes a first sealing bracket coupled to an outside of the first fan to form a path for an inflow of air from the outer environment and a second sealing bracket coupled to an outside of the second fan to form a path for an inflow of air from the outer environment.

According to another aspect of the present invention, the apparatus further includes a support bracket supporting rotation of each of the first and second fans, a coupling hole formed in the support bracket, and a projected fixing portion provided to the body housing to be coupled to the coupling hole, and the support bracket and the body housing are spaced apart from each other.

In another technical aspect of the present invention, provided herein is an apparatus for measuring dust, the apparatus including a dust sensor having an entrance and an exit, a venturi tube forming a path connected to the entrance of the dust sensor, a first tube hole formed at one point of the venturi tube to form a path of an inflow from an outer first space to the venturi tube, a second tube hole formed at the other point of the venturi tube to form a path of an inflow from an outer second space to the venturi tube, a third fan provided to the outer hole or the inner hole to form a flow amount in the venturi tube, and a controller driving the third fan if a pressure of the venturi tube is equal to or smaller than a first pressure.

In further technical aspect of the present invention, provided herein is an apparatus for measuring dust, the apparatus includes a fourth fan forming a flow amount, a fourth fan installing part having the fourth fan installed therein, the fourth fan having first and second entrances into which the flow amount formed by the fourth fan flows and an exit from which the inflow air is discharged, a first dust sensor having an entrance connected to an outer first space and an exit connected to the first entrance, and a second dust sensor having an entrance connected to an outer second space and an exit connected to the second entrance.

In another further technical aspect of the present invention, provided herein is an apparatus for measuring dust, the apparatus including a dust sensor forming a sensing path, first and second holes respectively formed on both sides of the sensing path of the dust sensor, a bidirectional fan provided to either the first hole or the second hole, and a controller driving the bidirectional fan to have a direction of a flow amount selectively, wherein a flow path of air is formed in order of an outer first space, the dust sensor, the bidirectional fan and an outer second space or in order of the outer second space, the dust sensor, the bidirectional fan and the outer first space.

Advantageous Effects

Effects of a dust measuring apparatus according to the present invention are described as follows.

According to at least one of embodiments of the present invention, dust concentrations of air in two spaces can be advantageously measured using a single device.

According to at least one of embodiments of the present invention, responsiveness of a dust concentration measurement can be advantageously raised.

According to at least one of embodiments of the present invention, noise generated from a dust concentration measurement can be advantageously minimized.

According to at least one of embodiments of the present invention, high responsiveness can be advantageously provided with less cost.

According to at least one of embodiments of the present invention, accuracy of measurement can be advantageously raised by removing other uninteresting particles in the air.

Other objects and further scope of applicability of the present disclosure will become apparent from the detailed description given below. It is to be understood, however, that the detailed description and specific examples such as preferred embodiments of the disclosure are given by way of illustration only, since it is obvious to those skilled in the art that various changes and modifications can be made within the spirit and scope of the disclosure.

BEST MODE FOR INVENTION

Figure 1:
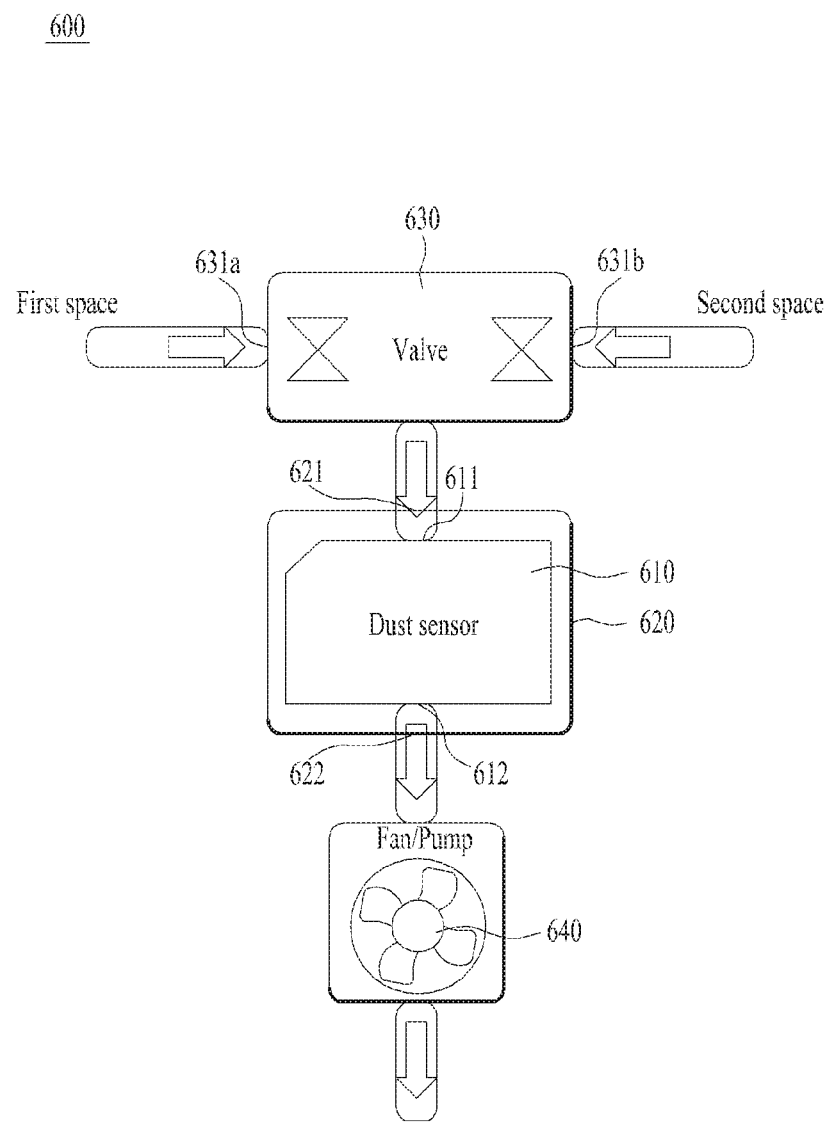
FIG. 1 schematically shows one embodiment of a dust measuring device of the related art.

A dust sensor is used to measure an amount of dust in specific air. For accurate measurement of a dust amount, a measurement target air should pass through a dust sensor.

Therefore, a dust measuring device having a dust sensor includes a structure of making external air flow in or out of the dust sensor.

In the air inflow/outflow structure of the dust measuring device, two major configurations include a configuration of making external air flow in and a configuration of forming a flow path for making the inflow air reach or leave the dust sensor.

In doing so, in order to measure a dust state of external air clearly, a device for making the external air flow in at a predetermined flow amount and a predetermined flow velocity is required. And, it is also necessary to minimize an inflow of air in an unintended area or the like.

The configuration of making external air flow in representatively includes a fan or compressor. The fan or compressor makes air flow in or out by generating a pressure difference between an inside and outside of a dust measuring device.

A single dust sensor basically measures an air state of a single space but may measure air states of areas including two or more spaces by making a time difference in between.

The present invention is based on a premise that air states of areas including two or more spaces are measured.

For examples of a case that a dust concentration measurement is necessary for air of two spaces, there are a case of intending to obtain a dust concentration difference between internal air and external air of a car, a case of intending to obtain a dust concentration difference between the air flowing into an air cleaner and the air flowing out of the air cleaner with respect to the air cleaner, etc.

Thus, in order to measure air states, i.e., dust concentrations of two spaces physically spaced apart from each other, a dust measuring device connected to each outer space can be provided.

Yet, in some cases, air states of two spaces can be measured using a single dust measuring device. The present invention described a dust measuring device usable for such a case.

Thus, in case of measuring dust concentrations of two or more spaces through a single dust measuring device, there are several items that should be considered.

First of all, responsiveness of a dust measurement of each space should be good. Good measurement responsiveness means that the demand for a measurement of each space is obtainable instantly. Namely, in case of intending to measure an air state of a second space in the course of measuring an air state of a first space, the dust measurement responsiveness means an extent of obtaining such intension instantly. The better the responsiveness gets, the smaller the noise of a measurement value becomes.

Secondly, it is necessary to consider the reliability on the sealing of a flow path through which air flows. If air of a different space flows into a path through which air is made to flow into a dust sensor by a fan or pump, as noise is generated, it is unable to obtain an accurate measurement value. Therefore, it is necessary to completely seal the space of the corresponding path.

Or, a flow amount or velocity of air can be affected by an extent of the well-closed or sealing state of a dust measuring device, whereby a difference or noise can be caused to a dust concentration measurement value.

Thirdly, it is necessary to consider the structural simplification. If a dust measuring device is complicated and has an increased volume, various spots need to be sealed so as to cause a problem of the cost increase. Thus, a structure needs to be simplified appropriately.

FIG. 1 schematically shows one embodiment of a dust measuring device 600 of the related art.

The related are dust measuring device 600 for measuring dust of two spaces can include a dust sensor 610 having an entrance and an exit 612 and a solenoid valve 630 enabling air of a first space or air of a second space to flow in selectively.

Here, the first space and the second space may mean two spaces physically partitioned from each other. For example, in case of a dust measuring device provided to a car, the first space may include external air and the second space may include internal air. Such concept may be exactly applicable to the following embodiments of the present invention.

The solenoid valve 630 enables air to flow in from the two spaces selectively. When dust of the first space is measured, an entrance 632 from the second space is closed. When dust of the second space is measured, an entrance 631 from the second space is closed.

The solenoid valve 630 is complicatedly structured and has a disadvantage that such a complicated structure requires high cost.

The related art dust measuring device includes a fan 640 provided near the entrance 612 of the dust sensor 610 to generate a force for enabling dust to flow in from the first or second space. The fan 640 generates a flow amount in a direction of the exit 612 from the entrance 611 of the dust sensor 610. Namely, the fan 640 generates a pressure difference that a pressure at the exit 612 is relatively lower than that of the entrance 611 with respect to the entrance 611 and the exit 612 of the dust sensor 610.

A pump or the like can be employed as well as the fan, which is identically applied to the following embodiments of the present invention.

By the pressure difference generated by the fan 640 located near the exit 612 of the dust sensor 610, the air of the first space and the second space forms a flow amount toward the dust sensor 610. In doing so, as air flows in from an unintended different space, e.g., a first space entrance 631a and a second space entrance 631b of the solenoid valve 630 or an entrance 621 or an exit 622 of a sensor installed unit 620 having the dust sensor 610 installed therein, it may be possibly mixed with the air of the first or second space.

This causes noise to an air state measurement result.

Moreover, according to the properties of the solenoid valve 630, the first space entrance 631a or the second space entrance 631b should be selectively opened or closed. When the dust of the first space is measured for the above purpose, an inflow path from the second space should be completely closed, i.e., sealed. On the contrary, when the dust of the second space is measured, the inflow path from the first space should be sealed.

Since such a sealing structure causes the cost increase, it is necessary to minimize a sealing required area.

Described in the following is a dust measuring device having high accuracy with low cost by minimizing such a sealing structure and implementing a simple structure.

Figure 2:
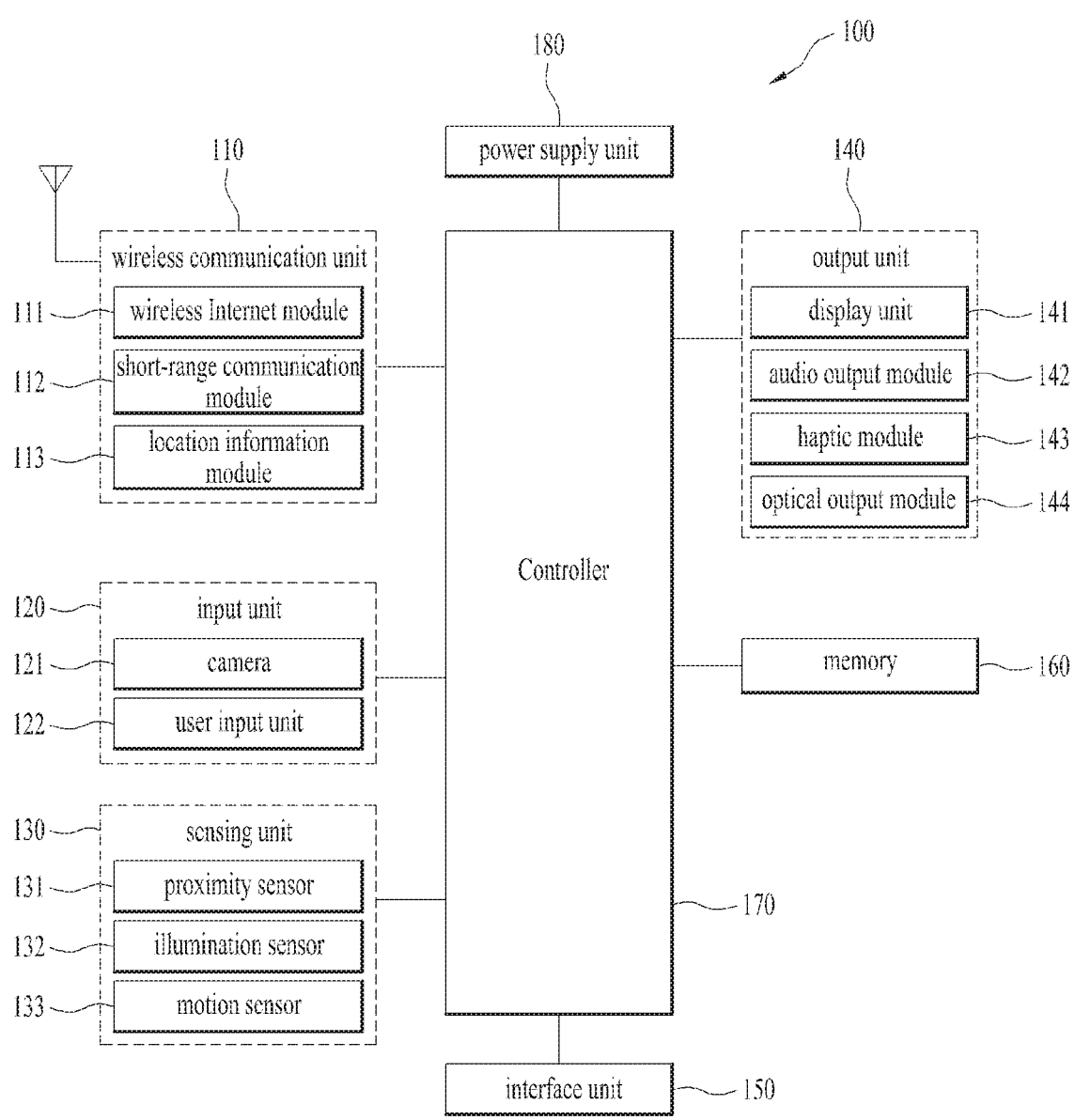
FIG. 2 is a block diagram of a dust measuring device in accordance with the present disclosure.

FIG. 2 is a block diagram of a dust measuring device (100) in accordance with the present disclosure.

The dust measuring device (100) is shown having components such as a wireless communication unit (110), an input unit (120), a sensing unit (130), an output unit (140), an interface unit (150), a memory (160), a controller (170), and a power supply unit (180).

It is understood that implementing all of the illustrated components is not a requirement, and that greater or fewer components may alternatively be implemented.

Referring now to FIG. 2, the dust measuring device (100) is shown having wireless communication unit (110) configured with several commonly implemented components. For instance, the wireless communication unit (110) typically includes one or more components which permit wireless communication between the dust measuring device (100) and a wireless communication system or network within which the dust measuring device (100) is located. The wireless communication unit (110) typically includes one or more modules which permit communications such as wireless communications between the dust measuring device (100) and a wireless communication system, communications between the dust measuring device (100) and another dust measuring device, communications between the dust measuring device (100) and an external server. Further, the wireless communication unit (110) typically includes one or more modules which connect the dust measuring device (100) to one or more networks.

To facilitate such communications, the wireless communication unit (110) includes one or more of a wireless Internet module (111) a short-range communication module (112), and a location information module (113).

The short-range communication module (112) is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module (112) in general supports wireless communications between the dust measuring device (100) and a wireless communication system, communications between the dust measuring device (100) and another dust measuring device (100), or communications between the mobile terminal and a network where another dust measuring device (100) (or an external server) is located, via wireless area networks. One example of the wireless area networks is a wireless personal area networks.

In some embodiments, another dust measuring device (100) (which may be configured similarly to dust measuring device (100)) may be a wearable device, for example, a smart watch, a smart glass or a head mounted display (HMD), which is able to exchange data with dust measuring device (100) (or otherwise cooperate with the dust measuring device (100). The short-range communication module (112) may sense or recognize the wearable device, and permit communication between the wearable device and the dust measuring device (100). In addition, when the sensed wearable device is a device which is authenticated to communicate with the dust measuring device (100), the controller (170), for example, may cause transmission of data processed in the dust measuring device (100) to the wearable device via the short-range communication module (112). Hence, a user of the wearable device may use the data processed in the dust measuring device (100) on the wearable device. Or, the dust measuring device 100 may perform a specific operation by receiving a delivery of data processed through a mobile terminal or a wearable device.

For example, the data on the skin state measured by the dust measuring device 100 is transmitted to the mobile terminal or the wearable device. As the data is databased, the tendency of a skin state change is obtained. IT is then able to control the drive of the dust measuring device by sensing feedback based on the obtained tendency.

The dust measuring device (100) may be configured to include short-range communication techniques such as Bluetooth™, Radio Frequency Identification (RFID), Infrared Data Association (IrDA), UltraWideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between dust measuring devices and generally occurs within about 10 cm. The NFC module may operate in one of a card mode, a reader mode, or a P2P mode. The dust measuring device (100) may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the dust measuring device. Single Wire Protocol (SWP)-based data exchange may be performed between the NFC module and the security module.

In a case where the NFC module operates in a card mode, the dust measuring device (100) may transmit card information on a general IC card to the outside.

When the NFC module operates in a reader mode, the dust measuring device (100) can read data from an external tag.

The data received from the external tag by the dust measuring device (100) may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser).

In some cases in which the NFC module operates in a P2P (Peer-to-Peer) mode, the dust measuring device (100) can execute P2P communication with another dust measuring device (100). In this case, Logical Link Control Protocol (LLCP) may be applied to the P2P communication. For P2P communication, connection may be generated between the dust measuring device (100) and another dust measuring device (100). This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

The location information module (113) is generally configured to detect, calculate, derive or otherwise identify a position of the dust measuring device (100). As an example, the location information module (113) includes a Global Position System (GPS) module, a Wi-Fi module, or both. If desired, the location information module (113) may alternatively or additionally function with any of the other modules of the wireless communication unit (110) to obtain data related to the position of the dust measuring device (100). As one example, when the dust measuring device (100) uses a GPS module, a position of the dust measuring device (100) may be acquired using a signal sent from a GPS satellite. As another example, when the dust measuring device (100) uses the Wi-Fi module, a position of the dust measuring device (100) can be acquired based on information related to a wireless access point (AP) which transmits or receives a wireless signal to or from the Wi-Fi module.

The input unit (120) includes a camera (121) for obtaining images or video, a microphone (122), which is one type of audio input device for inputting an audio signal, and a user input unit (123) (for example, a touch key, a push key, a mechanical key, a soft key, and the like) for allowing a user to input information. Data (for example, audio, video, image, and the like) is obtained by the input unit (120) and may be analyzed and processed by controller (170) according to device parameters, user commands, and combinations thereof.

The camera (121) can process image frames such as still or moving images obtained by the image sensor in a capture mode or a video call mode. The processed image frames can then be displayed on the display unit (141) or stored in the memory (160).

The camera (121) typically includes at least one a camera sensor (CCD, CMOS etc.), a photo sensor (or image sensors), and a laser sensor.

Implementing the camera (121) with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The camera 121 provided to the dust measuring device 100 can perform a function of photographing an attached skin surface state in particular. If a display unit 141 is provided, the photographed skin surface state is outputted so that a user can check the skin surface state.

The user input unit (122) is a component that permits input by a user. Such user input may enable the controller (170) to control operation of the dust measuring device (100). The user input unit (122) may include one or more of a mechanical input element (for example, a key, a button located on a front and/or rear surface or a side surface of the dust measuring device (100), a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit (130) is typically implemented using one or more sensors configured to sense internal information of the dust measuring device (100), the surrounding environment of the dust measuring device (100), user information, and the like. For example, in FIG. 2, the sensing unit (130) is shown having a proximity sensor (131) and an illumination sensor (132). If desired, the sensing unit (130) may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera (121)), a microphone, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The dust measuring device (100) may be configured to utilize information obtained from sensing unit (130), and in particular, information obtained from one or more sensors of the sensing unit (130), and combinations thereof.

The sensing unit 130 senses at least one of information in the dust measuring device 100, ambient environment information around the dust measuring device 100, and user information and then generates a sensing signal corresponding to the sensed information. Based on the sensing signal, the controller 170 may control the drive or operation of the dust measuring device 100 or perform a data processing, function or operation related to an application program installed on the dust measuring device 100.

The proximity sensor (131) may include a sensor to sense presence or absence of an object approaching a surface, or an object located near a surface, by using an electromagnetic field, infrared rays, or the like without a mechanical contact. The proximity sensor (131) may be arranged at an inner region of the dust measuring device (100) covered by the touch screen, or near the touch screen.

The proximity sensor (131), for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor (131) can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor (131) may sense proximity touch, and proximity touch patterns (for example, distance, direction, speed, time, position, moving status, and the like). In general, controller (170) processes data corresponding to proximity touches and proximity touch patterns sensed by the proximity sensor (131), and cause output of visual information on the touch screen. In addition, the controller (170) can control the dust measuring device (100) to execute different operations or process different data according to whether a touch with respect to a point on the touch screen is either a proximity touch or a contact touch.

A touch sensor can sense a touch applied to the touch screen, such as display unit (141), using any of a variety of touch methods. Examples of such touch methods include a resistive type, a capacitive type, an infrared type, and a magnetic field type, among others.

As one example, the touch sensor may be configured to convert changes of pressure applied to a specific part of the display unit (151), or convert capacitance occurring at a specific part of the display unit (151), into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

In some embodiments, the controller (170) may execute the same or different controls according to a type of touch object that touches the touch screen or a touch key provided in addition to the touch screen. Whether to execute the same or different control according to the object which provides a touch input may be decided based on a current operating state of the dust measuring device (100) or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller (170), for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

When a touch input is sensed by a touch sensor, corresponding signals may be transmitted to a touch controller. The touch controller may process the received signals, and then transmit corresponding data to the controller (170). Accordingly, the controller (170) may sense which region of the display unit (141) has been touched. Here, the touch controller may be a component separate from the controller (170), the controller (170), and combinations thereof.

The output unit (140) is typically configured to output various types of information, such as audio, video, tactile output, and the like. The output unit (140) is shown having a display unit (141), an audio output module (142), a haptic module (143), and an optical output module (144). The display unit (141) may have an inter-layered structure or an integrated structure with a touch sensor in order to facilitate a touch screen. The touch screen may provide an output interface between the dust measuring device (100) and a user, as well as function as the user input unit (122) which provides an input interface between the dust measuring device (100) and the user.

The display unit (141) is generally configured to output information processed in the dust measuring device (100). For example, the display unit (141) may display execution screen information of an application program executing at the dust measuring device (100) or user interface (UI) and graphic user interface (GUI) information in response to the execution screen information.

The interface unit (150) serves as an interface with various types of external devices that can be coupled to the dust measuring device (100). The interface unit (150), for example, may include any of wired or wireless ports, external power supply ports, wired or wireless data ports, memory card ports, ports for connecting a device having an identification module, audio input/output (I/O) ports, video I/O ports, earphone ports, and the like. In some cases, the dust measuring device (100) may perform assorted control functions associated with a connected external device, in response to the external device being connected to the interface unit (150).

The memory (160) is typically implemented to store data to support various functions or features of the dust measuring device (100). For instance, the memory (160) may be configured to store application programs executed in the dust measuring device (100), data or instructions for operations of the dust measuring device (100), and the like. Some of these application programs may be downloaded from an external server via wireless communication. Other application programs may be installed within the dust measuring device (100) at time of manufacturing or shipping, which is typically the case for basic functions of the dust measuring device (100) (for example, receiving a call, placing a call, receiving a message, sending a message, and the like). It is common for application programs to be stored in the memory (160), installed in the dust measuring device (100), and executed by the controller (170) to perform an operation (or function) for the dust measuring device (100).

The controller (170) typically functions to control overall operation of the dust measuring device (100), in addition to the operations associated with the application programs. The controller (170) may provide or process information or functions appropriate for a user by processing signals, data, information and the like.

The power supply unit (180) can be configured to receive external power or provide internal power in order to supply appropriate power required for operating elements and components included in the dust measuring device (100). The power supply unit (180) may include a battery, and the battery may be configured to be embedded in the terminal body, or configured to be detachable from the terminal body.

The power supply unit (180) may receive external power or provide internal power and supply the appropriate power required for operating respective elements and components included in the dust measuring device (100). The power supply unit (180) may include a battery, which is typically rechargeable or be detachably coupled to the terminal body for charging.

At least some of the components may cooperatively operate to implement an operation, control or controlling method of the dust measuring device 100. And, the operation, control or controlling method of the dust measuring device 100 may be implemented on the dust measuring device by launching at least one application program stored in the memory 160.

First Embodiment

A dust measuring device 200 configured to form a flow amount in a direction of being pushed to a dust sensor can be provided by including fans independently despite sharing a same flow path in order to measure air states of two spaces.

Figure 3:
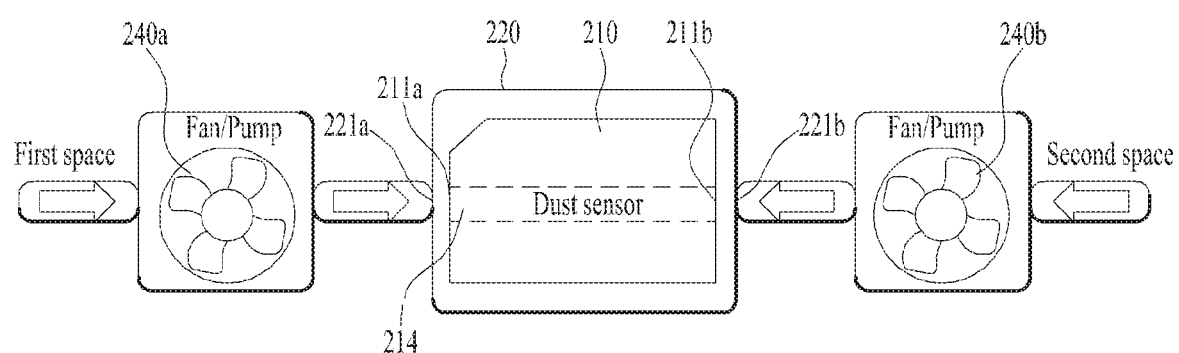
FIG. 3 schematically shows one configuration of a first embodiment.

FIG. 3 schematically shows one configuration of a first embodiment.

A dust sensor 210 may be installed in a body housing 220 of a dust measuring device 200. The body housing 220 may have the dust sensor 210 installed therein and form at least one portion of a whole flow path of the dust measuring device 200.

A first outer hole 221a and a second outer hole 221b are provided to the body housing 220. The first outer hole 221a and the second outer hole 221b are formed at two points of the body housing 220, respectively. The first outer hole 221a and the second outer hole 221b may be connected to a first inner hole 211a and a second inner hole 211b of the dust sensor 210, respectively.

The first outer hole 221a is connected to an outer first space and the second outer hole 221b is connected to an outer second space. Here, the outer first space and the outer second space may be partitioned from each other.

A first fan 240a is provided to a position corresponding to the first outer hole 221a and a second fan 240b is provided to a position corresponding to the second outer hole 221b. Here, the 'corresponding to' may mean that the first fan 240a is configured to form an air flow amount from the first outer hole 221a to the dust sensor 210 and that the second fan 240b is configured to form an air flow amount from the second outer hole 221b to the dust sensor 210.

Namely, the first fan 240a may be provided between the first space and the dust sensor 210 and form a pressure difference to enable air of the first space to flow into the dust sensor 210. And, the second fan 240a may be provided between the second space and the dust sensor 210 and form a pressure difference to enable air of the second space to flow into the dust sensor 210. Namely, each fan 240 can apply a force in a direction in which the external air is pulled to a position of the fan and then pushed to the dust sensor.

The disposition of the fan 240 that generates a force applied in a manner of pushing the air to the dust sensor 210 is advantageous in the sealing structure.

It is enough for the above-described sealing structure to consider sealing the spot of pulling the air to the fan 240 from the outer space.

For example, if air flows from the outer first space in directions of the first fan 240a, the first outer hole 221a and the first inner hole 211a of the dust sensor 210, it is enough for the sealing structure to be implemented in a manner of preventing air of another space from flowing only to the first fan 240a from the outer first space.

Namely, regarding a subsequent area, i.e., an area on which a force for pushing the air pulled in by the fan 240 works, although a measured air (here, air of the outer first space) leaks through an unsealed gap, it is hard for an unintended external air (e.g., air of the outer second space, etc.) to flow in.

The above description applies to a case that a flow amount is formed in directions of the second fan 240b, the second outer hole 221b and the second inner hole 211b of the dust sensor 210 from the outer second space. Namely, it is enough for the sealing structure to be implemented in a manner of preventing air of another space from flowing only to the second fan 240b from the outer second space.

For such reasons, the first fan 240a may be provided to an outside of the first outer hole 221a and the second fan 240b may be provided to an outside of the second outer hole 221b. Namely, if each fan 240 is provided to an inside of the outer hole 221, it is necessary to implement the sealing for the outer hole 221 as well.

First of all, a controller of the measuring device 200 may selectively drive the first fan 240a or the second fan 240b and then measure a dust state of air on the outer first or second space selectively. In case of measuring the air dust concentration of the outer first space, it is able to control the first fan 240a to be driven without driving the second fan 240b. In case of measuring the air dust concentration of the outer second space, it is able to control the second fan 240b to be driven without driving the first fan 240a.

In case of desiring to measure the dust concentrations of the outer first space and the outer second space both, it is able to obtain the result by driving the first fan 240a and the second fan 240b by leaving a time difference in between.

The controller needs to measure a dust concentration in air for a flow amount generated by the driven fan 240 assortatively. Namely, as the dust sensor 210 does not sense a flow direction of air by itself, the controller should assort and match it. If a change of a measurement result due to a change of a flow direction of air becomes more distinctive, the controller can assort it more easily.

A size, revolution speed, etc. of the fan 240 may become factors for determining an air flow amount together with a size and shape of a path for forming a flow amount, which has an influence on performing a dust measurement accurately. Namely, it is necessary to optimize an air flow amount for the accurate dust measurement.

Figure 4:
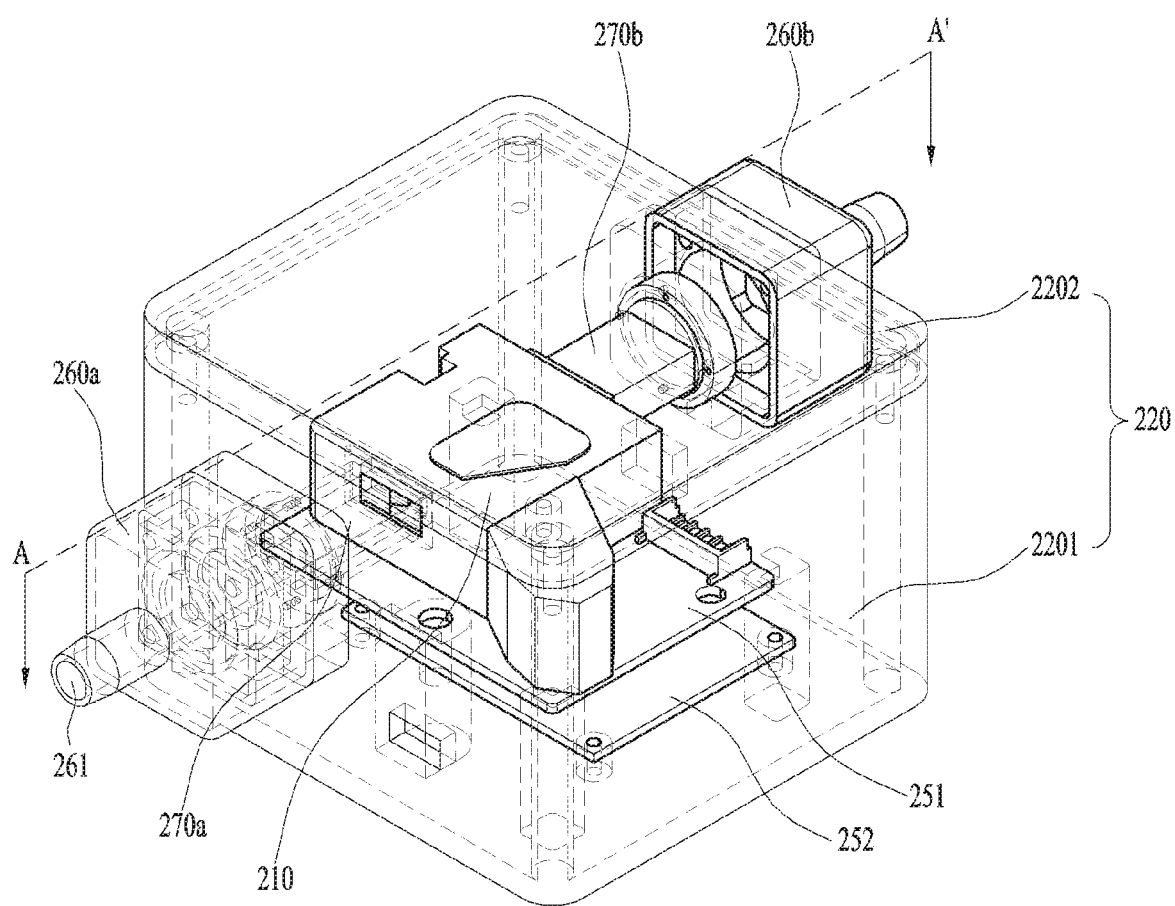
FIG. 4 shows one detailed configuration of a dust measuring device of a first embodiment.
Figure 5:
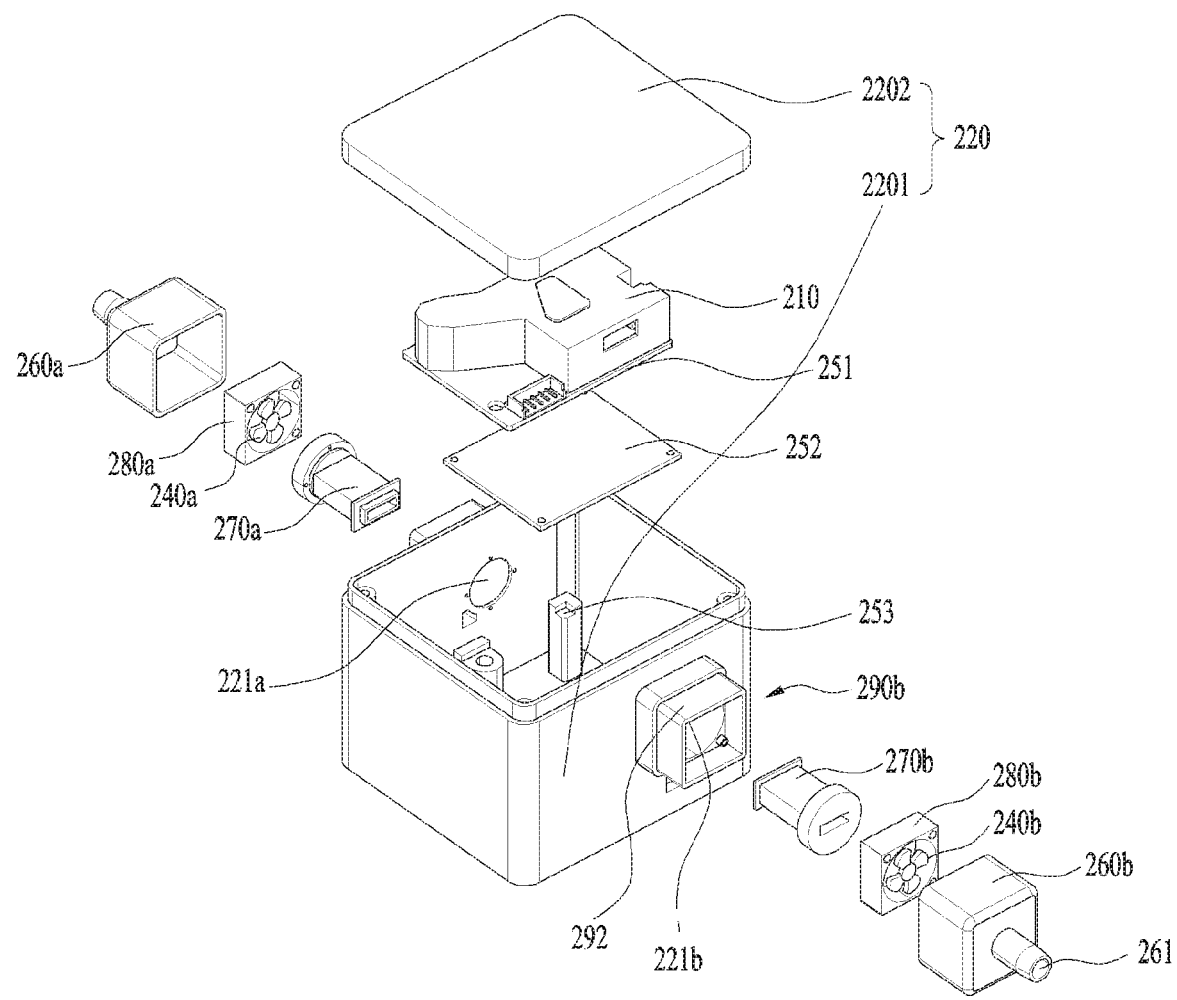
FIG. 5 shows one detailed configuration of a dust measuring device of a first embodiment.

FIG. 4 and FIG. 5 show one detailed configuration of the dust measuring device 200 of the first embodiment.

FIG. 4 is an assembled perspective diagram of the dust measuring device 200 of the first embodiment. FIG. 5 is an exploded perspective diagram of the dust measuring device 200 of the first embodiment.

A body housing 220 may have polyhedral shapes such as a rectangular parallelepiped and the like.

The body housing 220 may include two faces confronting each other. And, a first outer hole 221a and a second outer hole 221b may be formed in the two faces confronting each other, respectively. The first outer hole 221a and the second other hole 221b may be configured parallel to each other.

Namely, the best configuration is obtained in a manner that the first outer hole 221a and the second outer hole 221b are provided on the same line.

In case that the first outer hole 221a and the second outer hole 221b are provided on the same line, when fluid such as air or the like flows to the second outer hole 221b from the first outer hole 221a, and vice versa, it is able to minimize the occurrence of undesired turbulence, which means that the aforementioned responsiveness becomes better.

The body housing 220 may include a seat portion 2201 forming a mount portion of a recessed region and a cap 2202 covering the seat portion 2201. If the cap 2202 covers the seat portion 2201, an area except the first outer hole 221a and the second outer hole 221b becomes well-closed. Here, the term 'well-closed' does not mean that air cannot leak or flow in owing to the perfect sealing but means 'shut off' from outside in a range of not interrupting a flow amount in an intended different area considerably.

In the present invention, regarding 'well-closed' and 'sealing', 'well-closed' may mean a state that small particles such as air, dust and the like can flow in and out despite being blocked enough not to allow such a configuration as an object to pass through. And, 'sealing' may mean a state that small particles such as air, dust and the like cannot flow in and out despite being blocked enough not to allow such a configuration as an object to pass through. Namely, 'sealing' may have a further confined concept of 'well-closed'.

The dust sensor 210 may be installed in the body housing 220 in a manner of being mounted on an installation board 251. The installation board 220 may be connected to a main board 252 directly or indirectly. A controller configured to control the drive of the dust sensor 210 or fan and the like may be provided to the main board 252. The controller may be provided as a chip of an Application Processor (AP) type. A battery playing a role as a power supply unit may be provided to the body housing 220 as well.

The installation board 251 and the main board 252 may be fixed to a seat guide part 253 formed in the body housing 220. The seat guide part 253 may have a shape corresponding to a boundary region of the installation board 251 or the main board 252.

Figure 6:
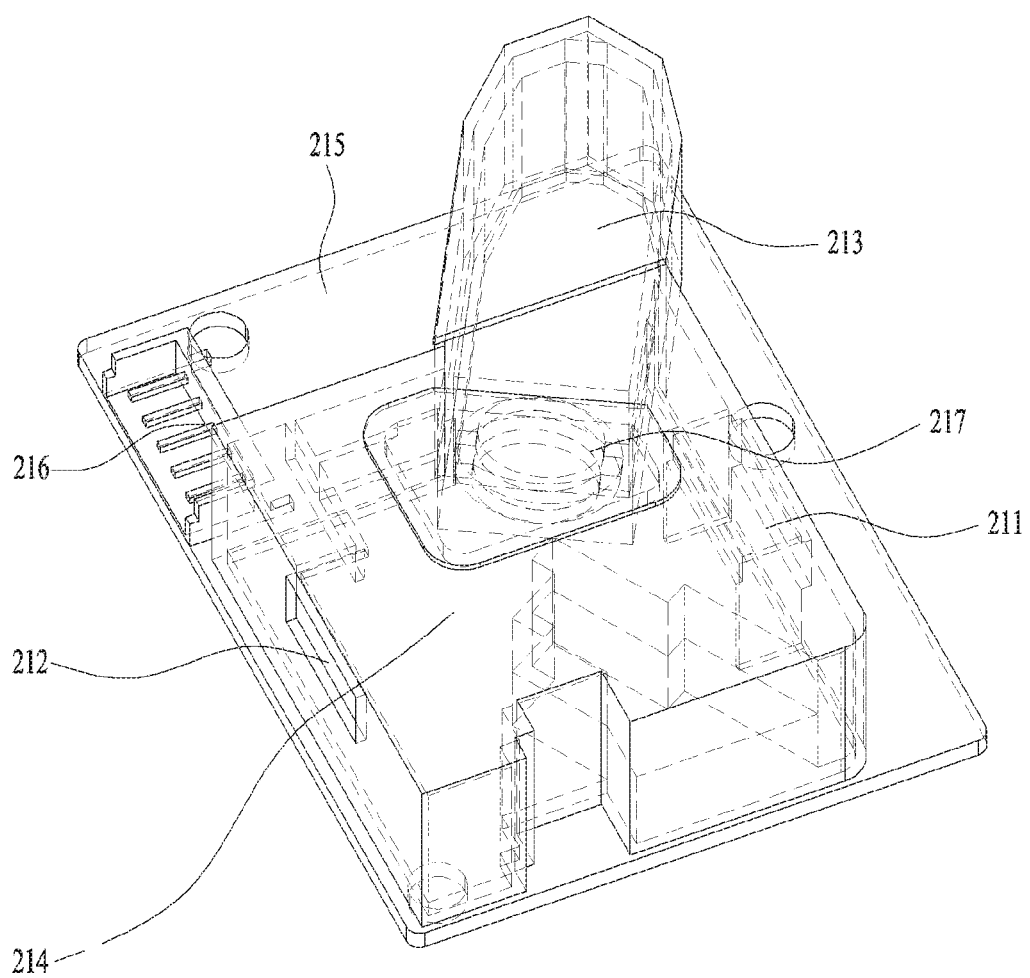
FIG. 6 shows one embodiment of a dust sensor related to the present invention.

FIG. 6 shows one embodiment of the dust sensor 210 related to the present invention.

As described above, the dust sensor 210 may include the optical type. Namely, the dust sensor 210 can optically sense a relative amount of dust in the flow-in air.

The dust sensor 210 may have a sensing path 214 through which air and dust pass through. Holes on both sides as an entrance and an exit of the sensing path 214 may become the first inner hole 211a and the second inner hole 211b.

A sensing unit 213 measuring a relative amount of dust by applying light is provided to a prescribed point on the sensing path 214 formed by the first and second inner holes 211a and 211b.

In case that air flows on the sensing path of the dust sensor 210 in both directions, each of the first and second inner holes 211a and 211b plays roles as both an entrance and an exit.

Air containing dust flows through the first inner hole 211a, the sensing unit and the second inner hole 211b in order, and a dust state of the air flowing in from the first inner hole 211a may be measured. On the contrary, air containing dust flows through the second inner hole 211b, the sensing unit 213 and the first inner hole 211a in order, and a dust state of the air flowing in from the second inner hole 211b may be measured.

The dust sensor 210 may include additional holes such as a third inner hole 217 and the like. The third inner hole 217 forms an opening wider than that of each of the first and second inner holes 211a and 211b, thereby facilitating an access to the sensing unit 213.

The sensing unit 213 is cleared through the third inner hole 217, whereby recognition accuracy can be raised.

The third inner hole 217 may be installed in the body housing 220 while being in an open state. If necessary, the third inner hole 217 may be provided by being blocked to minimize the possibility of noise occurrence. To this end, the third inner hole 217 may be shut off using a tape or the like.

The dust concentration measurement accuracy of the dust sensor 210 may vary depending on a flow amount and velocity of a flow-in air, stability of the above-mentioned elements and the like. Hence, in order to raise the accuracy of the dust concentration measurement, an appropriate flow amount and velocity of an inflow air are required and such an appropriate state needs to be maintained consistently.

Figure 7:
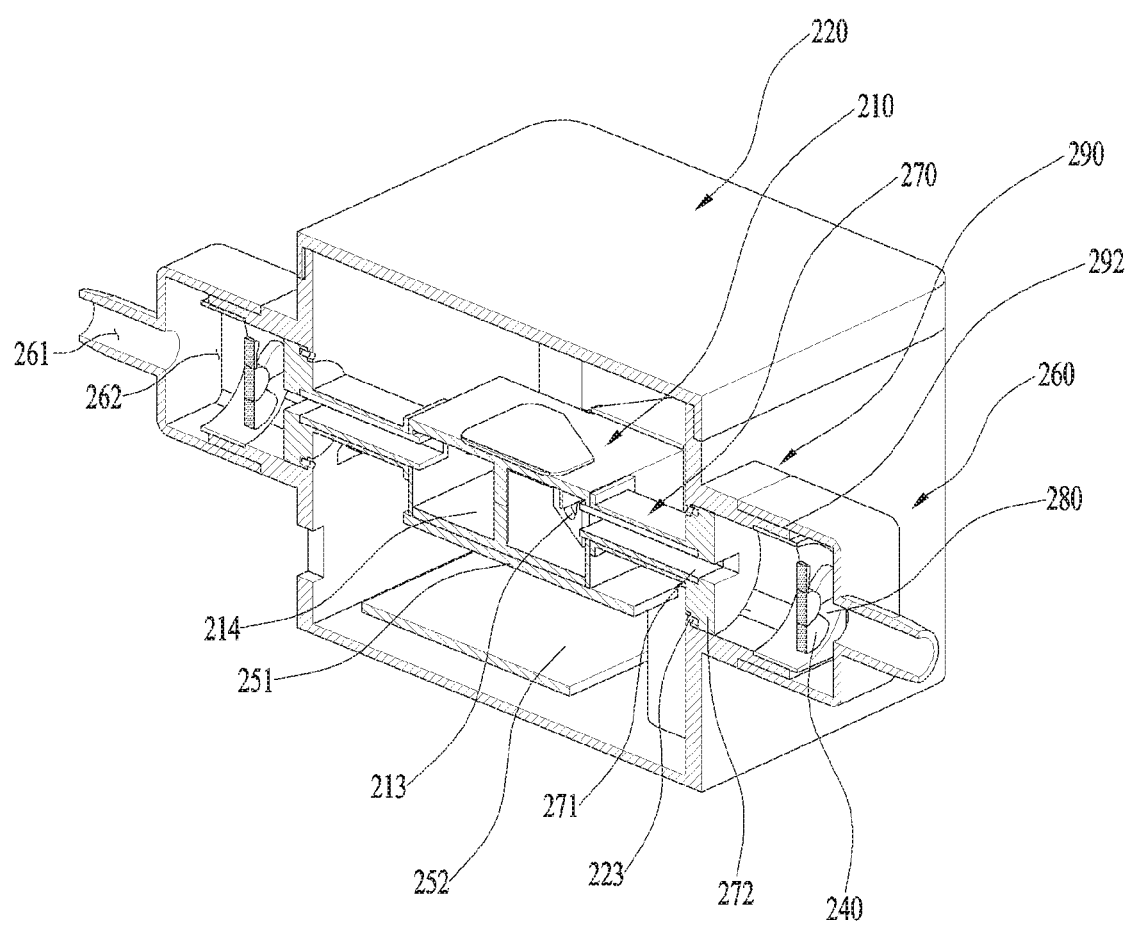
FIG. 7 is a cross-sectional diagram in the direction A-A' shown in FIG. 4.

FIG. 7 is a cross-sectional diagram in the direction A-A' shown in FIG. 4.

For clarity, FIG. 4 and FIG. 5 are referred to as well.

A vent bracket 270 forms an air flowing path by connecting the inner hole 211 provided to the dust sensor 210 and the outer hole 221 provided to the body housing 220 together.

The vent bracket 270 may include a first vent bracket 270a and a second vent bracket 270b. The first vent bracket 270a forms a path between the first inner hole 211a and the first outer hole 221a, and the second vent bracket 270b forms a path between the second inner hole 211b and the second outer hole 221b.

The vent bracket 270 may affect a flow amount, a flow velocity and the like of the air flowing from the outer hole 221 to the inner hole 211 or the air flowing from the inner hole 211 to the outer hole 221.

Particularly, the vent bracket 270 forms a path of fluid between the outer hole 221 and the inner hole 211, thereby preventing air from flowing into another area of an inner space of the body housing 220 unnecessarily.

The vent bracket 270 has a vent hole 271 that is a flow path from the outer hole 221 to the inner hole 211. The vent hole 271 has a specific cross-sectional shape, thereby affecting a flow amount and a flow velocity.

In case that the vent hole 271 of the vent bracket 270 has a cross-sectional area decreasing gradually toward the inner hole 211 from the outer hole 221, it may play a role as a nozzle. In case that the vent hole 271 of the vent bracket 270 has a cross-sectional area increasing gradually toward the inner hole 211 from the outer hole 221, it may play a role as a diffuser.

The shape of the vent hole 271 of the vent bracket 270 eventually determines shapes and sizes of the outer hole 221 and the inner hole 211 as well as the shape and size of the flow path between the outer hole 221 and the inner hole 211.

The vent bracket 270 may be provided as a replaceable type applicable differently if necessary.

The vent bracket 270 is provided with a mesh filter, thereby performing a filtering function. The mesh filter plays a role in preventing an inflow of material, which is not a measured target, from causing damage to a device or preventing noise from being caused to a measurement result.

The mesh filter affects a cross-sectional area corresponding to the inflow or outflow of air and dust, thereby having an influence on a flow amount and a flow velocity as well.

The vent bracket 270 can be fixed to the inner hole 211 by being coupled in a direction of the inner hole 211 from an outside of the body housing 220.

The vent bracket 270 includes a hook portion 272 and forms an extending portion 223 on an outer lateral side of the body housing 220, and more particularly, on a region of a fan seat part 290 corresponding to the hook portion 272 of the vent bracket 270 so that the hook portion 272 can be fixed to the extending portion 223. The two configurations can be fixed by a fit.

The fan 240 may be provided outside the outer hole 221. The fan 240 plays a role in making air of an outer space flow into an internal space of the body housing 220, and more particularly, into the vent bracket 270 and the sensing path 214 to the dust sensor 210.

As described above, the first fan 240a is provided to the point corresponding to the first outer hole 221a and the second fan 240b is provided to the point corresponding to the second outer hole 221b. Particularly, the first fan 240a may be provided outside the first outer hole 221a and the second fan 240b may be provided outside the second outer hole 221b.

The fan 240 may be fixed to the body housing 220 through a support bracket 280. The support bracket 280 may provide a rotation shaft of each of the first and second fans 240a and 240b.

The fan seat part 290 fixes the support bracket 280. The fan seat part 290 forms an inner space by forming a projected outer wall on an outer lateral side of the body housing 220 and the support bracket 280 can be fixed by being fitted into the inner space.

A sealing bracket 260 protects the fan 240 and the support bracket 280 so as to prevent them from being externally exposed in direct. The sealing bracket 260 may be provided in a shape corresponding to an outer lateral side 292 of one outer wall end of the fan seat part 290 of the body housing 220 and can be coupled to the body housing 220 including the fan seat part 290.

The sealing bracket 260 forms a flow path to the fan 240 from an outer space. A shale and size of the sealing bracket 260 affect a flow amount and a flow velocity of air flowing into the dust sensor 210.

The air of the inner space 262 of the sealing bracket 260 flows into the fan 240. Since the inner space 262 inevitably has an area enough to enclose an outside of the fan 240 or the support bracket 280 only, it may be restriction in adjusting a flow amount and velocity of air appropriately.

An inflow hole 261 forms a hole externally projected from the sealing bracket 260, thereby connecting an outer space and the inner space 262 of the sealing bracket 260 together.

The inflow hole 261 may have a width smaller than that of the inner space 262 of the sealing bracket 260. Namely, a shape configured in a manner of being connected from the inflow hole 261 having the small width to the inner space 262 of the sealing bracket 260 having the big width plays a role as a diffuser for the flowing-in air. The diffuser shape may decrease a flow velocity of air that reaches the fan 240. The atmospheric pressure or flow velocity of the outer space is not the element that can be controlled by the dust measuring device 100, whereby the flow amount or velocity of the air flowing into the dust sensor 210 may be changed unintentionally by the atmospheric pressure or flow velocity of the outer space. The diffuser shape minimizes the influence caused by such variables.

Particularly, the shape having the width rapidly increasing from the inflow hole 261 to the inner space 262 of the sealing bracket 260 generates turbulence, whereby the high flow velocity and amount from the outer space can be adjusted appropriately.

The above-described inflow hole 261 and the above-described width of the inner space 262 of the sealing bracket 260 use a prescribed direction vertical to a direction of the flow path as a criterion. The above-described concept of width may be substituted with the concept of a cross-sectional area. Namely, the features of the relationship between widths of the inflow hole 261 and the inner space 262 of the sealing bracket 260 are identically applicable to a cross-sectional area of a flow path.

By minimizing the influence attributed to the space of the outer space through the above features and also making external air flow in at an appropriate flow amount and velocity by controlling sizes and shapes of the vent hole 261 and the vent bracket 270, a rotation speed of the fan 240 and the like, accuracy of dust concentration measurement of the dust sensor 210 can be raised.

The inflow hole 261 has an outer lateral side configured in a projected cylinder shape, whereby configurations such as a connecting tube and the like are additionally coupled thereto to extend the flow path.

As described above, in case of the first embodiment, since the fan 240 plays a role in pushing the air of the outer space to the dust sensor 210, it is necessary to consider the sealing of a flow path area arriving at the fan 240 from the outer space only.

In such aspect, the sealing of a gap between the inflow hole 261 and the sealing bracket is required.

Particularly, if the inflow hole 261 and the sealing bracket 260 are formed by integrated injection molding, a sealing work on a gap between the inflow hole 261 and the sealing bracket 260 can be omitted. Yet, in case that the inflow hole 261 of the sealing bracket 260 is intactly exposed to the outer space in which air of a measured target exists, a separate sealing is not necessary. If the inflow hole 261 is indirectly exposed to the outer space by being joined to the aforementioned separate connecting tube and the like, it is necessary to seal a gap between the connecting tube, etc. and the sealing bracket 260 in addition.

If a negative pressure generated from the fan 240 affects the gap between the sealing bracket 260 and the fan seat part 290, air of another area may possibly flow into the gap. Hence, it is necessary to seal this region in addition.

Figure 8:
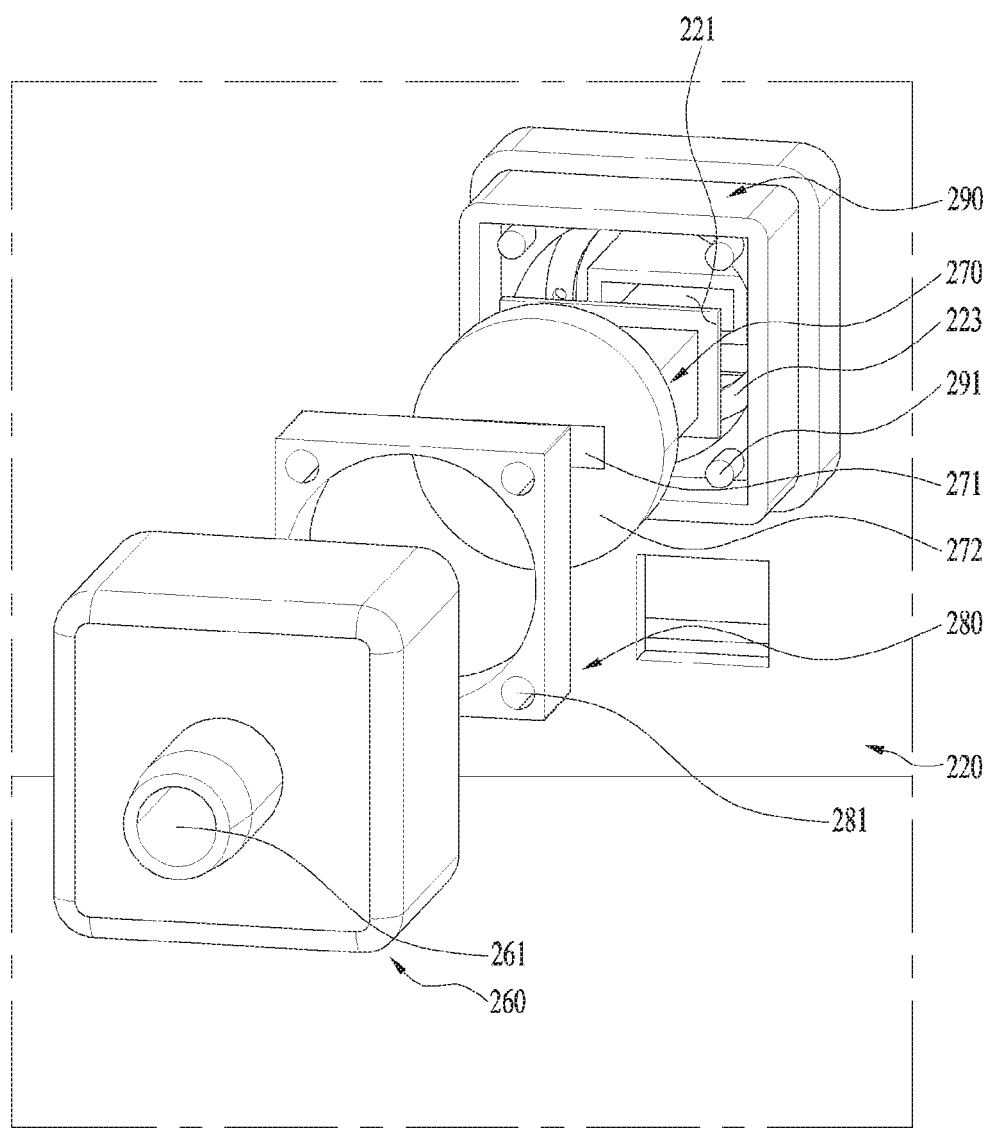
FIG. 8 is an exploded perspective diagram of a coupling region of a support bracket of the present invention.
Figure 9:
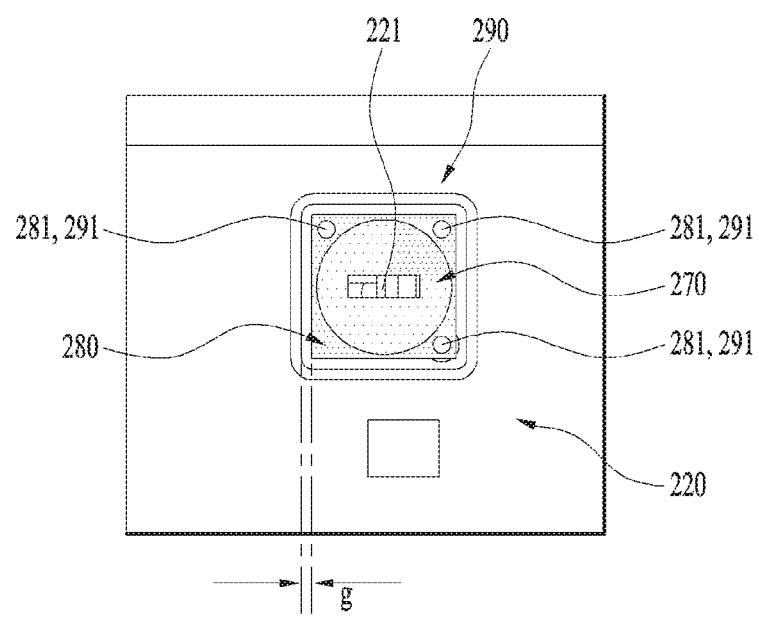
FIG. 9 is a front view diagram of a coupling region of a support bracket of the present invention.

FIG. 8 is an exploded perspective diagram of the coupling region of the support bracket 280 of the present invention. FIG. 9 is a front view diagram of the coupling region of the support bracket 280 of the present invention.

As the drive of the fan 240 may cause vibration to the whole body housing 220 having the support bracket 280 fixed thereto as well as to the support bracket 280, a structure capable of minimizing such vibration is required.

First of all, at least one of two components touching each other within the dust measuring device 100 may have material capable of a buffer function or buffer material may be added between the two components touching each other.

For example, since vibration of the fan 240 may be transferred between the vent bracket 270 and the extending portion 223, a configuration material of the vent bracket 270 may have a buffer function. For example, the vent bracket 270 may include an elastic material. As a representative example, rubber can be included.

Secondly, a touched area of two components touching each other within the dust measuring device 100 can be minimized.

For example, in order that vibration of the support bracket 280 generated by the drive of the fan 240 can be transferred to the body housing 220 as small as possible, a contact area between the support bracket 280 and the body housing 220 can be minimized.

To implement the above configuration, a coupling hole 281 is formed in the support bracket 280 and a projected fixing portion 291 is provided to the body housing 220, whereby the coupling hole 281 and the projected fixing portion 291 can be fixed to each other. Namely, not a whole outer lateral side of the support bracket 280 but a prescribed surface of the outer lateral side of the support bracket 280 comes into contact with the body housing 220 in part, whereby the generated vibration can be minimized.

Therefore, for a region except the projected fixing portion 291 and the coupling hole 281, the support bracket 280 and the body housing 220 can be provided in a manner of being spaced apart from each other.

The support bracket 280 and the body housing 220 may be in contact through screw coupling. Namely, they can be coupled through a screw and a screw hole instead of the projected fixing portion 291 and the coupling hole 281. The can obtain the effect similar to that of the coupling case using the projected fixing portion 291 and the coupling hole 281.

Second Embodiment

According to a second embodiment, air and dust of two spaces are measured using a venturi tube. According to the second embodiment unlike the first embodiment, an air state of one of a first space and a second space is measured and a mixed air state of the first and second spaces is measured. Through a difference thereof, an air state of the other space is measured.

Figure 10:
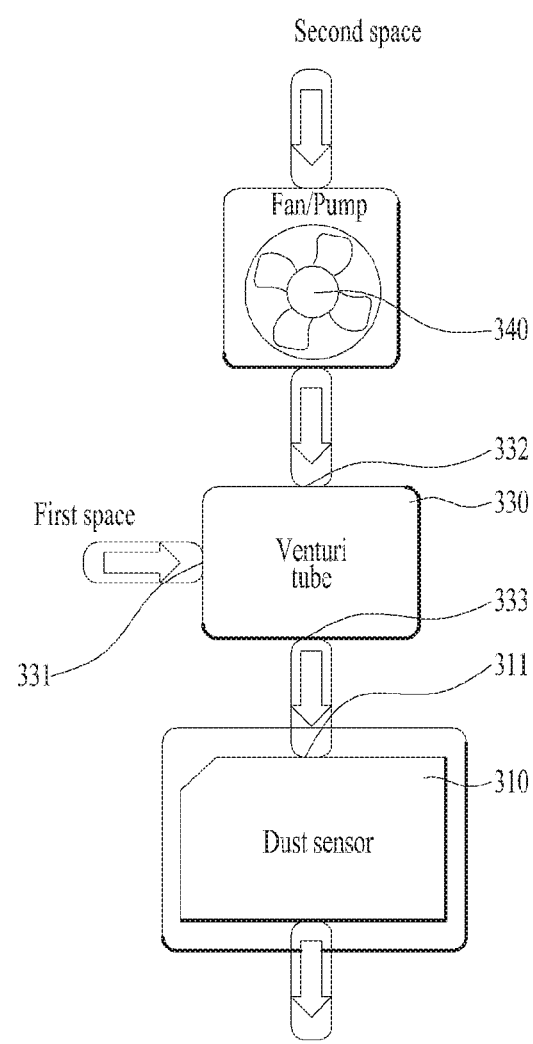
FIG. 10 schematically shows one configuration of a second embodiment.

FIG. 10 schematically shows one configuration of a second embodiment.

Particularly, FIG. 10 shows an example that a fan of the second embodiment is provided on a path of inflow from an outer second space. Yet, in some cases, the fan may be provided on a path of inflow from an outer first space.

A venturi tube 330 is connected to an entrance 311 of a dust sensor 310. A first tube hole 331 forming a path of an inflow to a venture pipe from the outer first space may be included in the venturi tube 330. A second tube hole 332 forming a path of an inflow to a venture pipe from the outer second space may be included in the venturi tube 330.

Here, the dust sensor 310 has the same configuration of the former dust sensor 210 of the first embodiment unless mentioned separately. Yet, the dust sensor 310 of the second embodiment may perform a sensing on one direction instead of bidirectional sensing.

Each air flowing in through the first tube hole 331 or the second tube hole 332 may be mixed in the venturi tube 330. The mixed air of the two spaces flows out through an exit 333 of the venturi tube 330 and then flows into an entrance of the above-described dust sensor 310.

The air having flown into the entrance 311 of the dust sensor 310 goes out through an exit of the dust sensor, whereby an air state is measured.

If a pressure is high, i.e., a velocity of an inflow air is high, both the air of the outer first space and the air of the outer second space can be made to flow in through the first tube hole 331 and the second tube hole 332 by the venturi tube 330. On the contrary, if a pressure is low, i.e., a velocity of an inflow air is low, the air of the space next to the first tube hole 331 or the second tube hole 332 is made to flow in.

Namely, by comparing a dust state of the mixed air of the first and second spaces with a dust state of the air of one of the first and second spaces, the air states of the first space and the second space are calculated all.

A third fan 340 is provided to one side of the first tube hole 331 or the second tube hole 332 so as to form a flow amount in the venturi tube 330. If a pressure of the venturi tube 330 is low, i.e., a velocity of an inflow air is low, the third fan 340 forms a flow amount in a direction of pushing to the dust sensor 310 so that the air can flow into the second tube hole 332.

As described above, on the assumption of a low pressure state, if the third fan 340 is provided to the first tube hole 331, the air of the first space will flow into the venturi tube 330 and the dust sensor 310. If the third fan 340 is provided to the second tube hole 332, the air of the second space will flow into the venturi tube 330 and the dust sensor 310.

Assuming that a boundary value for indicating a low pressure state or a high pressure state is a first pressure, if a pressure is equal to or lower than the first pressure, the controller drives the third fan 340. If the pressure exceeds the first pressure, the controller may not drive the third fan 340.

As the second embodiment generates a pressure in a direction of pushing the external air to the dust sensor 310 like the first embodiment, it is enough for the sealing to be performed in a manner that air of a difference space is not introduced into air from an outer space until flowing into the third fan 340 only.

Third Embodiment

As one of dust measuring devices for measuring air states of two spaces, a dust measuring device 400 having two sensors and a single fan can be included.

Figure 11:
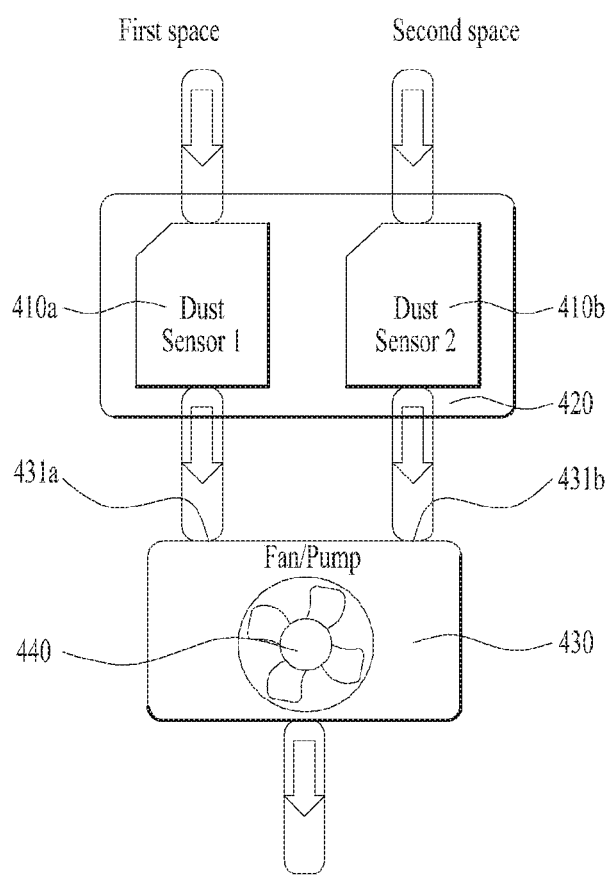
FIG. 11 schematically shows one configuration of a third embodiment.

FIG. 11 schematically shows one configuration of a third embodiment.

A first dust sensor 410a may measure an air state of an outer first space and a second dust sensor 410b may measure an air state of an outer second space.

Each of an exit of the first dust sensor 410a and an exit of the second dust sensor 410b forms a flow amount by a fourth fan 440.

The fourth fan 400 is installed in a fourth fan installing part 430 forming a flow amount. The fourth fan installing part 430 includes a first entrance 431a and a second entrance 431b into which air having the flow amount formed by the fourth fan 440 flows. An exit of the first dust sensor 410a is connected to the first entrance 431a and an exit of the second dust sensor 410b is connected to the second entrance 431b.

In case of the present embodiment, as two sensors 410a and 410b are used, the first and second dust sensors 410a and 410b are usable simultaneously. Therefore, a measurement time can be minimized.

Moreover, since the air of the outer first space and the air of the outer second space are not mixed on the path for the air to flow to each of the dust sensors 410a and 410b, the possibility of noise occurrence can be minimized.

The first dust sensor 410a and the second dust sensor 410b can be provided to a single board 420. The first and second dust sensors 410a and 410b installed on the board 420 can be controlled by a single controller and supplied with power from a single power supply unit.

Fourth Embodiment

According to the fourth embodiment, a dust measuring device 500 is configured in a manner of including a bidirectional fan capable of forming a flow amount selectively in both directions.

Figure 12:
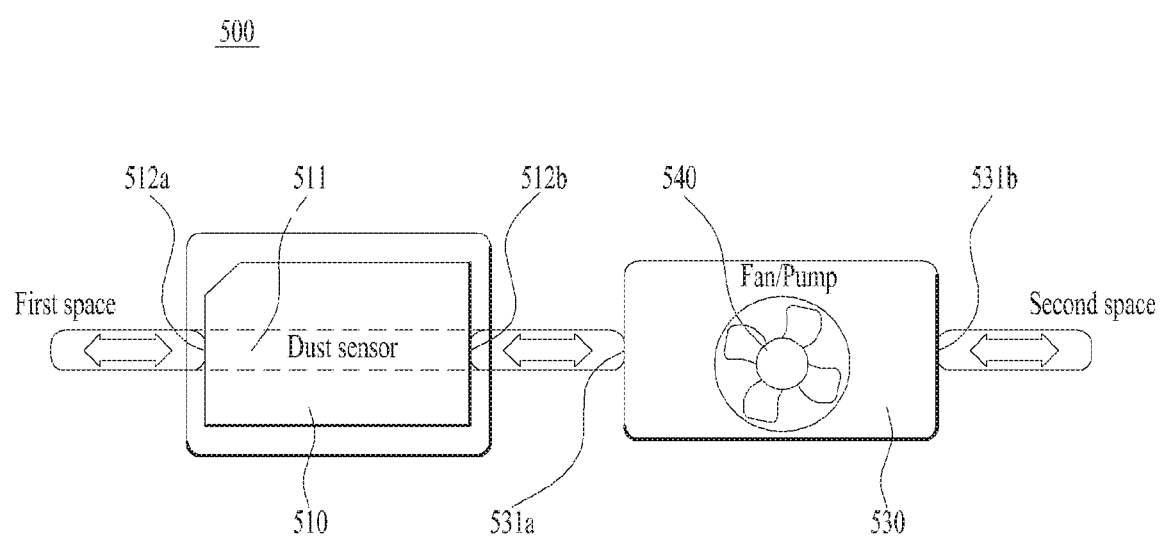
FIG. 12 schematically shows one configuration of a fourth embodiment.

FIG. 12 schematically shows one configuration of a fourth embodiment.

A dust sensor 510 may be provided to a prescribed point on a flow path of the whole air.

Here, the dust sensor 510 is capable of bidirectional measurement. A first hole 512a and a second hole 512b are provided to both sides of a sensing path 511 of the dust sensor 510, respectively. The first hole 512a on one side of the sensing path 511 of the dust sensor 510 is provided near an outer first space with reference to a sensing unit and the second hole 512b on the other side of the sensing path 511 is located near an outer second space with reference to the sensing unit.

A bidirectional fan 540 is provided to one side of the first hole 512a or the second hole 512b.

The bidirectional fan 540 may be provided to a bidirectional fan installing part 530, one side 531a of the bidirectional fan installing part 530 may be connected to the outer first space, and the other side 531b of the bidirectional fan installing part 530 may be connected to the outer second space.

It can be conceptually understood that one side of a flow amount formed by the bidirectional fan 540 is connected to the outer first space and that the other side is connected to the outer second space.

Although FIG. 12 shows that a flow path of air is formed in order of the outer first space, the dust sensor 510, the bidirectional fan 540 and the outer second space, a flow path of air may be formed in order of the outer second space, the dust sensor 510, the bidirectional fan 540 and the outer first space.

In case of measuring an air state of the outer first space, a controller drives the bidirectional fan 540 so as to form a flow amount in a direction of the outer second space from the outer first space. In case of measuring an air state of the outer second space, the controller drives the bidirectional fan 540 so as to form a flow amount in a direction of the outer first d space from the outer second space.

Since the present embodiment can measure air states of two spaces using a single dust sensor and a single fan, a relatively simple structure can be provided advantageously.

Yet, the bidirectional fan play a role in sucking air and a role in discharging air with reference to the dust sensor 510. Therefore, it is necessary to seal each point completely based on the aforementioned reasons.

MODE FOR INVENTION

Those skilled in the art will appreciate that the present disclosure may be carried out in other specific ways than those set forth herein without departing from the spirit and essential characteristics of the present disclosure.

The above description is to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

As described above, the present invention is applicable to sensors entirely or in part.

What is claimed is:

1. An apparatus for measuring dust of a first outer space and a second outer space, the apparatus comprising:
    a dust sensor;
    a body housing having the dust sensor installed therein and providing an inner space;
    a first outer hole formed at a first point of the body housing and connected to the first outer space and a second outer hole formed at a second point of the body housing and connected to the second outer space such that the inner space is connected to an outer environment, wherein the first outer space and the second outer space are separated from each other;
    first and second fans respectively provided to locations corresponding to the first and second outer holes and driven to form a flow amount in a direction toward the inner space from the outer environment; and
    a controller selectively driving one of the first and second fans,
    wherein the dust sensor comprises:
        first and second inner holes formed at two opposite sides of a sensing path going through the dust sensor, the first inner hole formed on a first side of the sensing path and the second inner hole formed on a second side of the sensing path; and
        a sensing unit provided to a prescribed point on the sensing path, and
    wherein the apparatus further comprises:
        a first vent bracket forming a closed path between the first inner hole and the first outer hole; and
        a second vent bracket forming a closed path between the second inner hole and the second outer hole.

2. The apparatus of claim 1, wherein the first fan is provided to an outside of the first outer hole and wherein the second fan is provided to an outside of the second outer hole.

3. The apparatus of claim 1, further comprising a mesh filter provided to each of the first and second vent brackets.

4. The apparatus of claim 1, further comprising:
    a first sealing bracket coupled to an outside of the first fan to form a path for an inflow of air from the outer environment; and
    a second sealing bracket coupled to an outside of the second fan to form a path for an inflow of air from the outer environment.

5. The apparatus of claim 1, further comprising:
    a support bracket supporting rotation of each of the first and second fans;
    a coupling hole formed in the support bracket; and
    a projected fixing portion provided to the body housing to be coupled to the coupling hole,
    wherein the support bracket and the body housing are spaced apart from each other.

* * * * *